US007195330B2

(12) United States Patent
Seino et al.

(10) Patent No.: US 7,195,330 B2
(45) Date of Patent: Mar. 27, 2007

(54) LIQUID CONTAINER FOR A LIQUID EJECTION DEVICE WITH A VIBRATION SENSOR FOR INK LEVEL DETECTION

(75) Inventors: Takeo Seino, Nagano (JP); Munehide Kanaya, Nagano (JP); Atsushi Kobayashi, Nagano (JP); Takahiro Katakura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 76 days.

(21) Appl. No.: 10/669,638

(22) Filed: Sep. 25, 2003

(65) Prior Publication Data

US 2004/0130583 A1 Jul. 8, 2004

(30) Foreign Application Priority Data

Sep. 25, 2002 (JP) .......................... P2002-278955

(51) Int. Cl.
*B41J 29/393* (2006.01)
*G01F 23/28* (2006.01)

(52) U.S. Cl. ...................................... 347/19; 73/290 V

(58) Field of Classification Search .................. 347/84, 347/85, 86, 87, 20, 14, 7, 19, 17; 73/290 V, 73/290 R See application file for complete search history.

(56) References Cited

U.S. PATENT DOCUMENTS 6,270,210 B1 * 8/2001 Yamaguchi et al. .......... 347/86
6,536,861 B1 * 3/2003 Usui et al. ...................... 347/7
6,745,626 B2 * 6/2004 Usui et al. ................ 73/290 R
2001/0040613 A1 * 11/2001 Nakazawa et al. ............ 347/86
2003/0015036 A1 * 1/2003 Young et al. ................. 73/579

FOREIGN PATENT DOCUMENTS

DE 199 17 229 A1 10/2000
JP 11258026 A * 9/1999
JP 2001-146019 A 5/2001

* cited by examiner

*Primary Examiner*—Stephen Meier
*Assistant Examiner*—Rene Garcia, Jr.
(74) *Attorney, Agent, or Firm*—Sughrue Mion, PLLC

(57) ABSTRACT

An ink container which includes an ink supply port for supplying ink to a recording head, and is formed with a flexible member shaped like a bag, which deforms in accordance with an amount of remaining ink contained therein, the ink container including: a sensor module serving as vibration activating and detecting unit, provided on one of the surfaces of the ink container, for emitting a vibration to the ink; and a rigid member provided on a location of the other surface of the ink container, which is opposed to the sensor module; wherein an amount of remaining ink is detected based on a vibration characteristic of the vibration activating and detecting unit which depends on a distance between the vibration activating and detecting unit and the rigid member.

47 Claims, 13 Drawing Sheets

LIQUID CONTAINER FOR A LIQUID EJECTION DEVICE WITH A VIBRATION SENSOR FOR INK LEVEL DETECTION

The present application is based on Japanese Patent Application No. 2002-278955, the entire contents of which are incorporated herein by reference.

BACKGROUND OF THE INVENTION

1. Field of the Invention

The present invention relates to a liquid container in which a liquid such as ink is contained in a flexible bag, and more particularly to technique for detecting an amount of remaining liquid in the container in a liquid ejection device.

2. Related Art

An ink container for supplying ink to an ink jet recording head mounted on a carriage via a passage maybe roughly classified into two types of ink containers; a first type of ink container in which ink is directly contained in a hard case, and a second type of ink container in which ink is contained in a flexible bag, and the bag is put in a hard case according to the necessity.

When the ink jet recording head is caused to perform ink ejecting operation such as printing in a state that no ink is supplied to the recording head, the recording head is fatally damaged. To avoid the damage, the management of the remaining ink amount is of particular importance.

There is a proposal of the management of the remaining ink amount (Japanese Patent Publication No. JP-A-2001-146019). The proposed management is implemented in the first type of ink container; ink is directly contained in a hard case. As described in the JP-A-2001-146019, a window, for example, is formed in a region located in level lower than a liquid level of ink in the ink container so that a vibration characteristic receives the ink. A piezoelectric vibrator is fixed to the window directly or with a vibration plate interposed therebetween. An amount of remaining ink is detected from a variation of a residual vibration due to an increase of an area of the vibration plate where it contacts with air, with a variation of a liquid level of the ink.

In the second type of ink container, viz., the ink bag is used as the ink container, even when ink is consumed, the ink bag is merely shrunk, and no air enters the ink bag. Accordingly, the surround of the vibration plate is not replaced with air. Accordingly, it is impossible to directly apply the method of detecting the amount of remaining ink to the second type of ink container.

German Unexamined Patent Publication No. 19917229 discloses the ink pack which is made of flexible material, and attached with a sensor capable of an ink level of the ink in the ink pack. A method for detecting an amount of ink in the ink pack and a specific structure of the sensor are not disclosed.

SUMMARY OF THE INVENTION

Accordingly, an object of the present invention is to provide a liquid container which exactly detects an amount of remaining liquid in a bag body.

According to one aspect of the invention, there is provided a liquid container for a liquid ejection device, which the liquid container includes a liquid supply port for supplying liquid to a liquid ejection head, and is formed with a flexible member shaped like a bag, which deforms in accordance with an amount of remaining liquid contained therein, the liquid container comprising: a vibration activating and detecting unit, provided on one of the surfaces of the liquid container, for emitting a vibration to the liquid; and a rigid member provided on a location of the other surface of the liquid container, which is opposed to the vibration activating and detecting unit;

wherein an amount of remaining liquid is detected based on a vibration characteristic of the vibration activating and detecting unit which depends on a distance between the vibration activating and detecting unit and the rigid member.

In the liquid container thus constructed, the liquid container deforms in accordance with liquid consumption. Accordingly, a vibration characteristic of the vibration activating and detecting unit also changes. Therefore, a degree of deformation of the liquid container, viz., an amount of remaining liquid, can be detected.

In a preferred embodiment of the invention, the vibration activating and detecting unit includes a substrate capable of maintaining a constant shape irrespective of deformation of the liquid container.

In another embodiment, a through-hole is formed in the liquid container at a location corresponding to a vibration region of the vibration activating and detecting unit, and the vibration activating and detecting unit is provided on a substrate having a recess into which liquid of the liquid container flows, and a vibration is emitted from the vibration activating and detecting unit to the liquid via the recess.

In a further embodiment, a through-hole is formed in the liquid container at a location corresponding to a vibration region of the vibration activating and detecting unit, and the vibration activating and detecting unit is provided on a substrate having a recess into which liquid of the liquid container flows, and a vibration is emitted from the vibration activating and detecting unit to the liquid via the recess.

With this feature, even when a predetermined region of the liquid container is flattened, it is possible to detect that this region is completely flat by detecting a vibration characteristic by the liquid in the recess having a predetermined size.

In an additional embodiment, a plurality of the vibration activating and detecting unit and a plurality of the rigid members are provided while being arranged in a direction in which a liquid level of liquid in the liquid container changes.

With this feature, even when an amount of consumed liquid is computed by detecting exactly amounts of remaining liquid in the liquid container and by using the number of liquid drops jetted and a liquid suction amount, a coefficient used when the amount of remaining liquid or consumed liquid is computed can be exactly computed. Accordingly, a liquid end state is detected with a high precision.

In another embodiment of the invention, the liquid container is housed in a hard case, and the rigid member is formed with the hard case.

This feature eliminates the necessity of using the member forming the rigid member. Accordingly, the structure is implied and cost to manufacture is reduced.

In yet another embodiment, the liquid container is housed in a hard case which has a raised portion in a predetermined region located apart from the liquid supply port in a region of the liquid container which serves as a bottom surface when the liquid container is set in a recording apparatus.

Even in a case where the liquid container is horizontally placed to uniformly flatten the liquid container, it is possible to reliably detect a time point that an amount of remaining liquid reaches a specific amount of remaining liquid.

In still another embodiment, conductive patterns are formed on a surface of the liquid container, which the conductive patterns are connected to the vibration activating and detecting unit.

This feature simplifies a connection structure for connecting the vibration activating and detecting unit to an external signal processor, and eliminates an influence of an external force by the cable to the vibration activating and detecting unit.

According to another aspect of the invention, there is provided a liquid container for a liquid ejection device, which the liquid container includes a liquid supply port for supplying liquid to a liquid ejection head, and is formed with a flexible member shaped like a bag, which deforms in accordance with an amount of remaining liquid contained therein, the liquid container comprising: a vibration activating unit, provided on one of the surfaces of the liquid container, for emitting a vibration to the liquid; and a vibration detecting unit provided on the other surface of the liquid container, which is opposed to the vibration activating unit; wherein an amount of remaining liquid is detected based on a vibration characteristic of the vibration activating and detecting unit.

In the instant embodiment, mere detection of presence or absence of the signal suffices when comparing with the case where the residual vibration immediately after the activation is detected in the embodiments mentioned above. Accordingly, the signal processing unit is simplified, and a thickness of the liquid bag, which varies with liquid consumption, may be detected in analog fashion, and hence, the amount of remaining liquid can be continuously monitored.

DETAILED DESCRIPTION OF THE DRAWINGS

The preferred embodiments of the present invention will be described with reference to the accompanying drawings.

Figure 1:
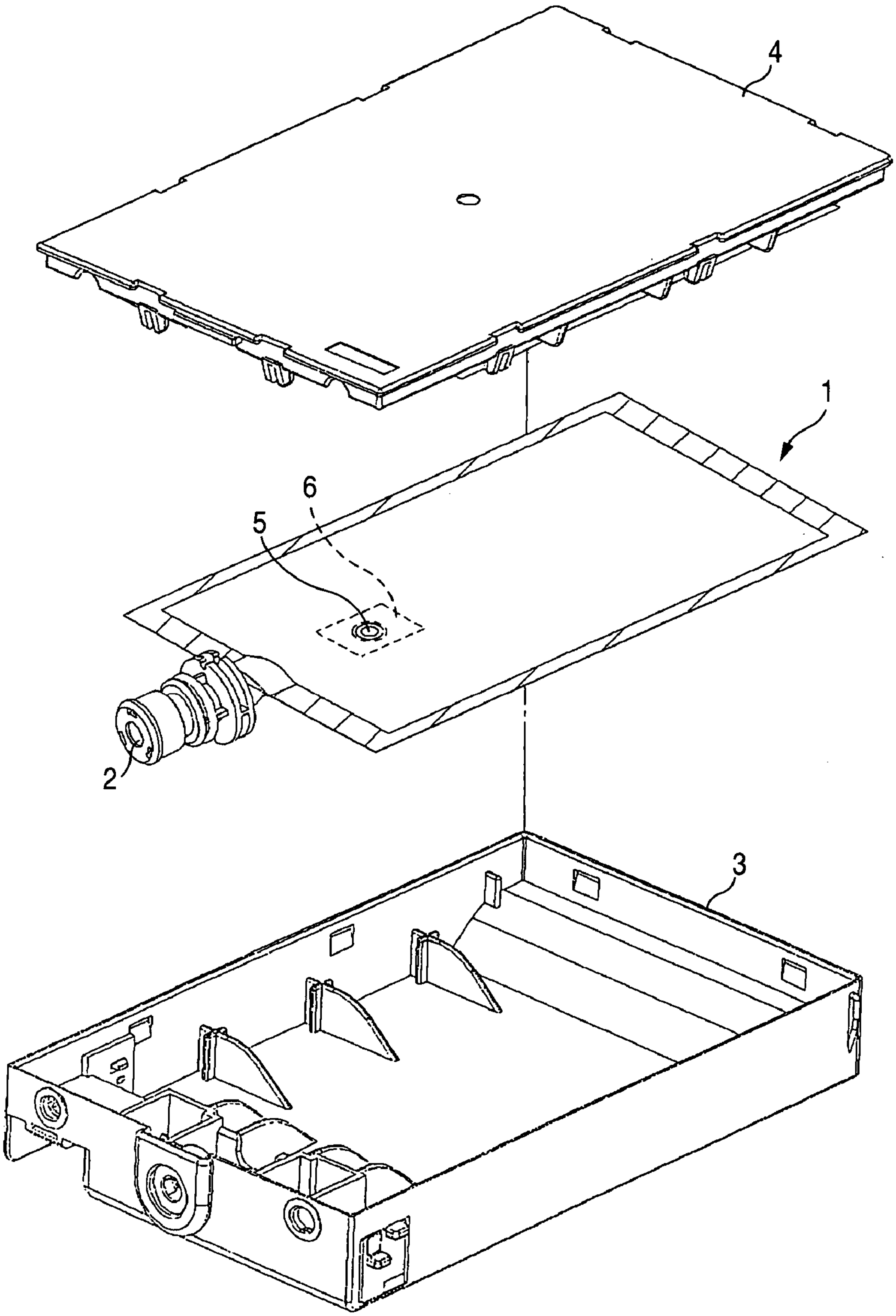
FIG. 1 is a perspective view showing an ink container for an ink jet recording apparatus which is an embodiment of the invention.
Figure 2:
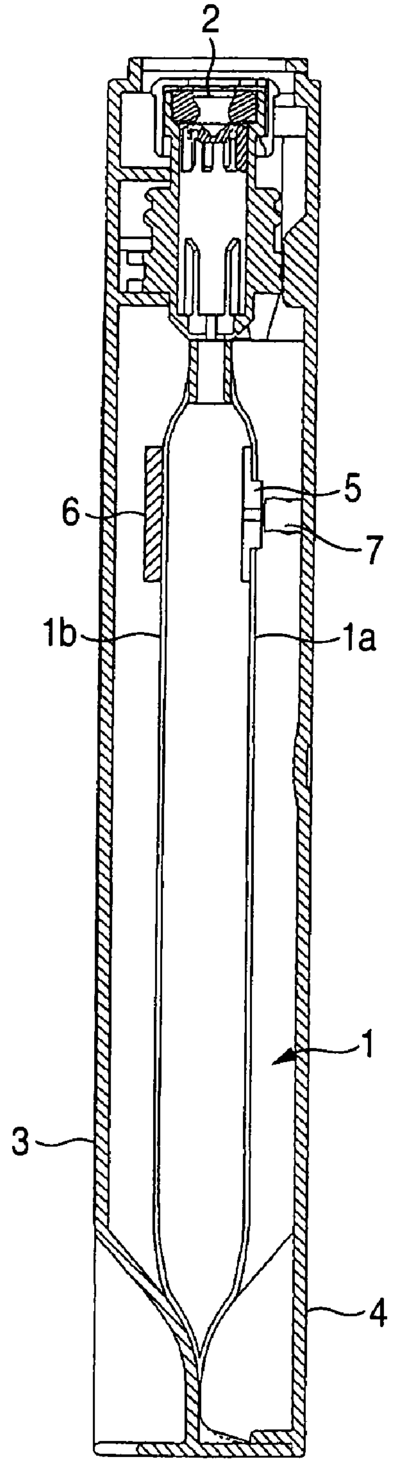
FIG. 2 is a cross sectional view showing the ink container.

FIGS. 1 and 2 cooperatively show an ink container which is an embodiment of the present invention. As seen from the figures, an ink supply port 2 is mounted on one side of a bag body suitable for containing ink therein. The ink supply port 2 is placed in a hard case defined by a case body 3 and a lid member 4 such that it may be exposed to outside as the situation demands. In the invention, an element in a state that the ink bag is contained in a hard case may be referred to an "ink cartridge".

The bag body forming the ink container (ink bag) 1 is formed with a film having flexibility properties and a gas shielding function. The film shrinks according to an amount of ink left in the bag.

At least one sensor module 5 to be described later is liquid tightly fixed to a predetermined position on the ink container 1, viz., one (designated by reference numeral 1*a*, and referred to as a "first surface") of surfaces of a region of the ink container whose thickness is considerably thin when an amount of remaining ink in the ink container reaches a predetermined amount of ink. A rigid member 6 is bonded to a position on the other surface (referred to as a "second surface") 1*b*, which is opposed to the sensor module 5. The rigid member 6 is made of a material having a higher rigidity than the film forming the bag body. In the figure, reference numeral 7 designates a flexible cable 7 for supplying a drive signal to the sensor module 5 or for receiving a detect signal from the same.

Figure 3A:
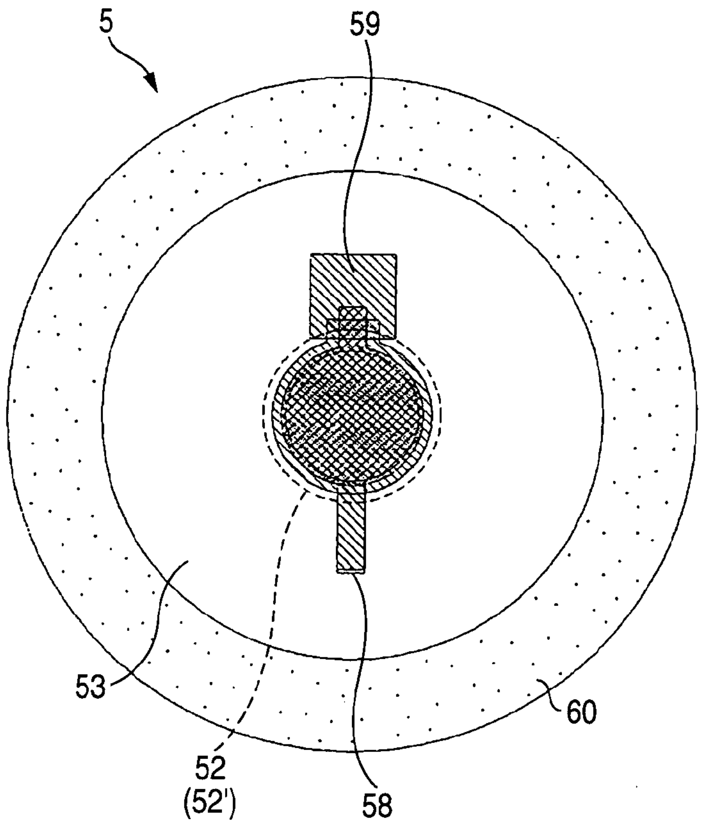
FIGS. 3A and 3B are a plan view and a cross sectional view showing an embodiment of a sensor module attached to the ink container.
Figure 3B:
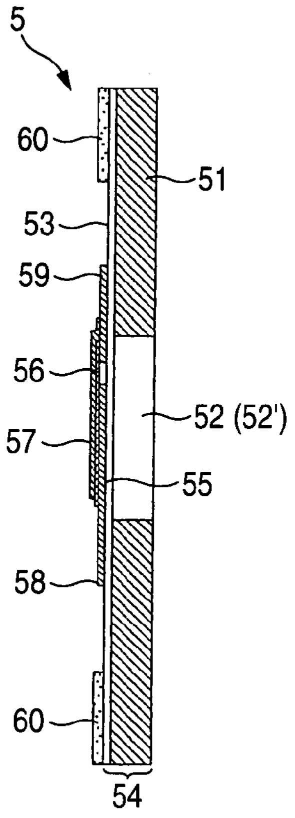

FIGS. 3A and 3B show an embodiment of the sensor module 5. the sensor module 5 is shaped to be adaptable to its bonding to a bored part. In the embodiment, a through-hole 52 is formed at the central part of a plate member 51, circular in shape. A vibration plate 53 is laminated on and fixed to a surface of the plate member 51 which will be an outer surface, whereby a substrate 54 is formed. With such a structure, a recess (indicated by reference numeral 52') which maintains a constant shape defined by the through-hole 52 and the vibration plate 53, by a rigidity of the substrate 54, is secured irrespective of deformation of the ink bag.

A lower electrode 55, a plate-like piezoelectric vibrator 56 and an upper electrode 57 are provided on a front surface of the vibration plate 53, and those electrodes 55 and 57 are connected to connection terminals 58 and 59, respectively. The lower electrode 55, the piezoelectric vibrator 56, the upper electrode 57, and the connection terminals 58 and 59 cooperatively form a vibration activating and detecting unit.

An annular adhesive layer 60 is formed on a peripheral region on one (an outer surface in the instant embodiment) of the surfaces of the substrate 54. The adhesive layer 60 is good for the joining of the sensor module to the ink container 1, and may be a heat fusing material layer or a tacky adhesive layer.

To mount the sensor module 5 to the bag body, a through-hole is formed at a predetermined position of the film forming the bag body. The through-hole allows the electrodes 55 and 57 and the connection terminals 58 and 59 to be exposed to outside. The sensor module 5 is inserted into the bag body, from the back side of the film, and fastened to the film of the bag body by providing the adhesive layer 60. The three sides of the film are joined to form a bag body by thermal fusion. The ink supply port 2 is firmly fixed to the remaining opened side of the film, and here the manufacture of the ink container 1 is completed.

Figure 4:
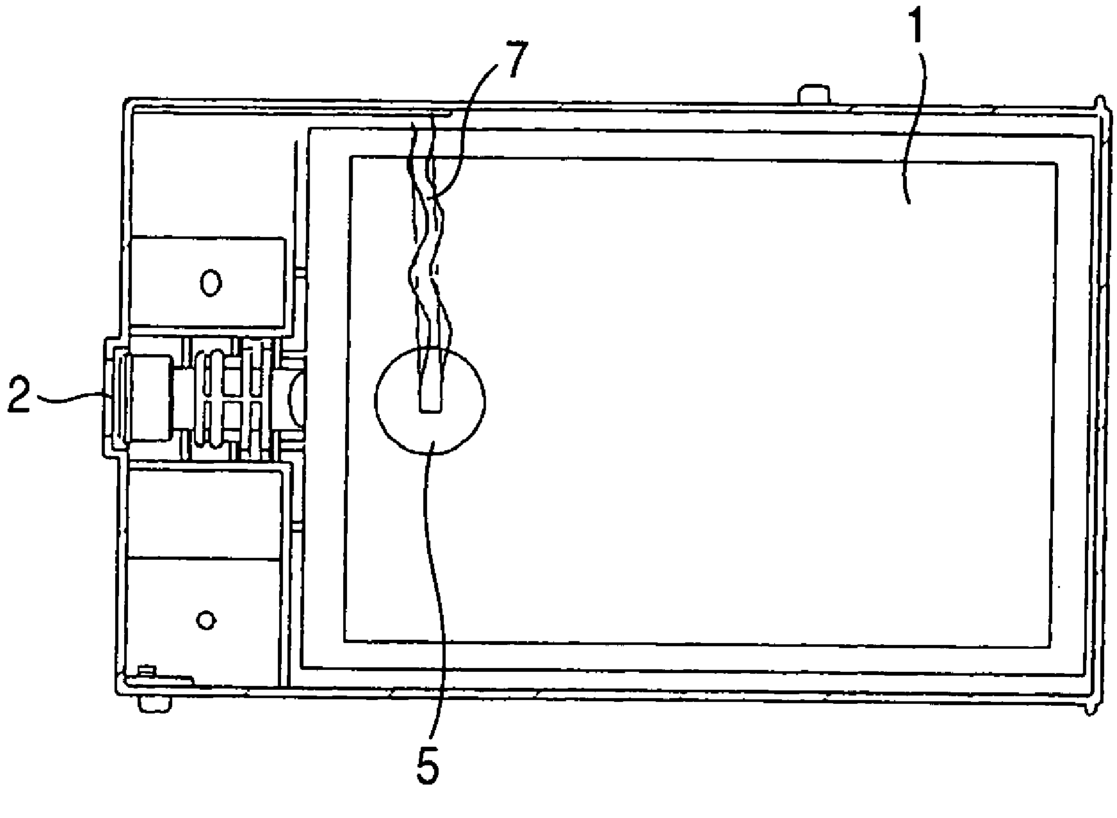
FIG. 4 is a cross sectional view showing a state that the ink container is housed in a hard case, and in this state mounted on the recording apparatus.

In the embodiment, the ink container 1 is placed in a non-horizontal state, for example, a substantially vertical state as shown in FIG. 4, and the ink supply port 2 is connected to an ink supplying passage for supplying ink to the recording head. When the recording head consumes ink through its recording operation or the like, ink is correspondingly consumed in the ink container 1, and the ink bag becomes thin.

Figure 5A:
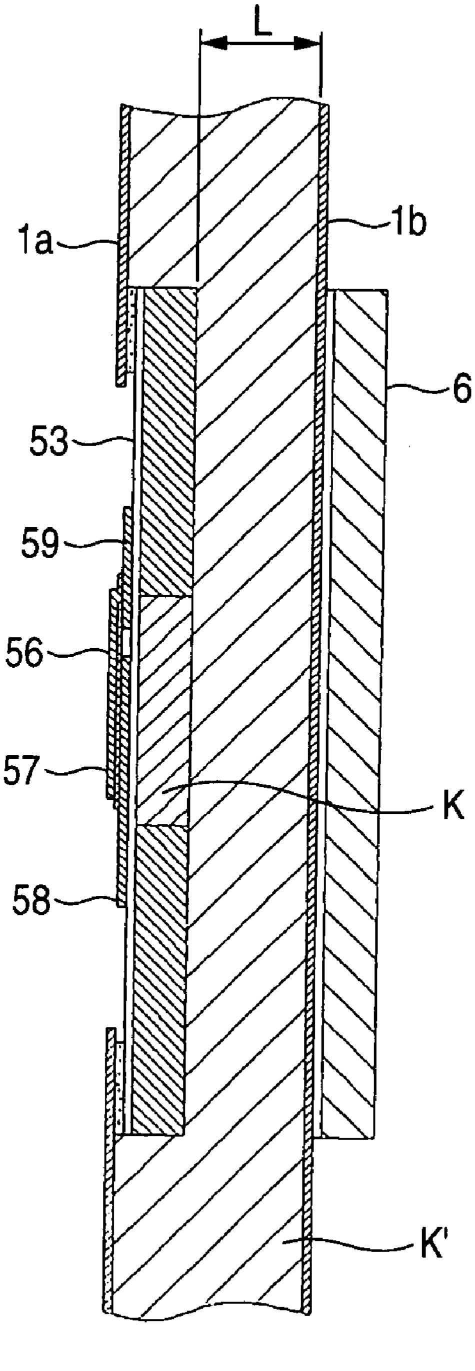
FIGS. 5A and 5B are sectional views showing a change of a region of the ink container near the sensor module when an amount of remaining ink in the ink container changes.
Figure 6A:
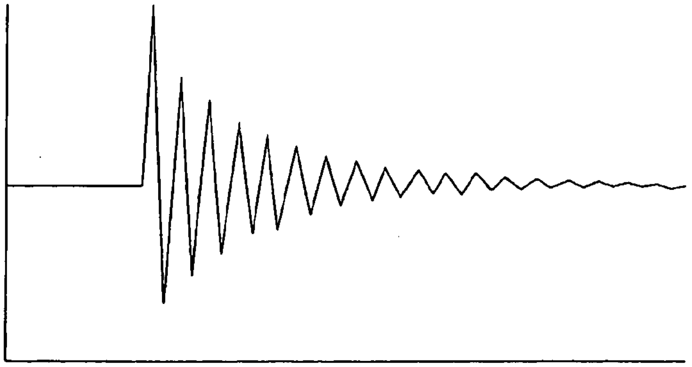
FIGS. 6A to 6D show waveforms of vibrations of the sensor module and equivalent circuits of the same.
Figure 6B:
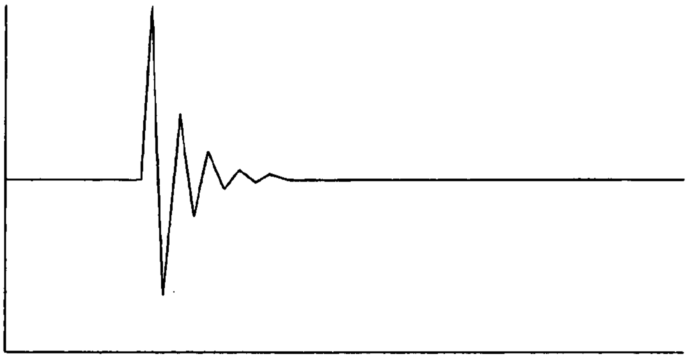
Figure 6C:
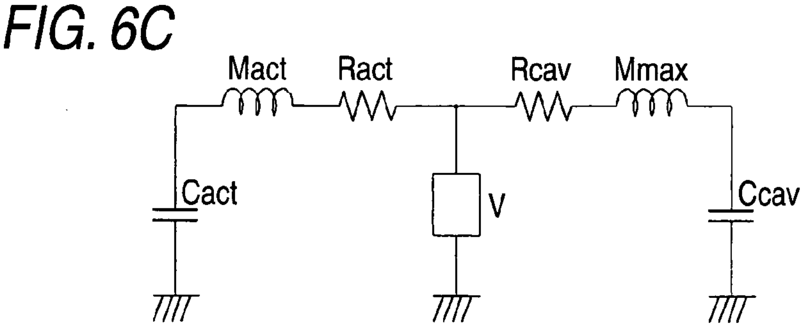

In a state that a sufficient amount of ink is present in the ink container, the second surface 1*b* of the ink container, which is supported by the rigid member 6 is spaced from the recess 52' of the sensor module 5 by a sufficient distance L, as shown in FIG. 5A. In this state, a drive signal is applied between the lower electrode 55 and the upper electrode 57 to activate the piezoelectric vibrator 56 one time. At this time, the piezoelectric vibrator 56 generates a residual vibration having about 10 waves, as shown in FIG. 6A. To secure silence, it is desirable to select the frequencies of the residual vibration to be out of audio frequencies, for example, within a range of 50 kHz to 500 kHz. To this end, a resonance frequency of the piezoelectric vibrator 56 is adjusted.

Where a sufficient amount of ink left in the ink container, an acoustic environment around the piezoelectric vibrator 56 is expressed by an equivalent circuit as sown in FIG. 6C. In the circuit, Mact, Cact and Ract are inertance, compliance and acoustic resistance of the piezoelectric vibrator 56.

Mmax is a maximum added inertance of ink inacavity defined by the recess 52' when a sufficient amount of ink is contained in the ink container. Ccav and Rcav are compliance and passage resistance of ink in the cavity, and V represents voltage applied to the piezoelectric vibrator.

An alternating electromotive force shown in FIG. 6A is transmitted as a detecting signal via the flexible cable 7 to a signal processor (not shown) which in turn determines an amount of remaining ink. If a signal containing only a natural vibration frequency component of the piezoelectric vibrator 56, which forms the vibration activating and detecting unit, of the alternating electromotive force is detected for a signal checking an amount of remaining ink, noise vibrations creeping thereinto from exterior are eliminated. As a result, an amount of remaining ink is detected highly accurately.

Figure 5B:
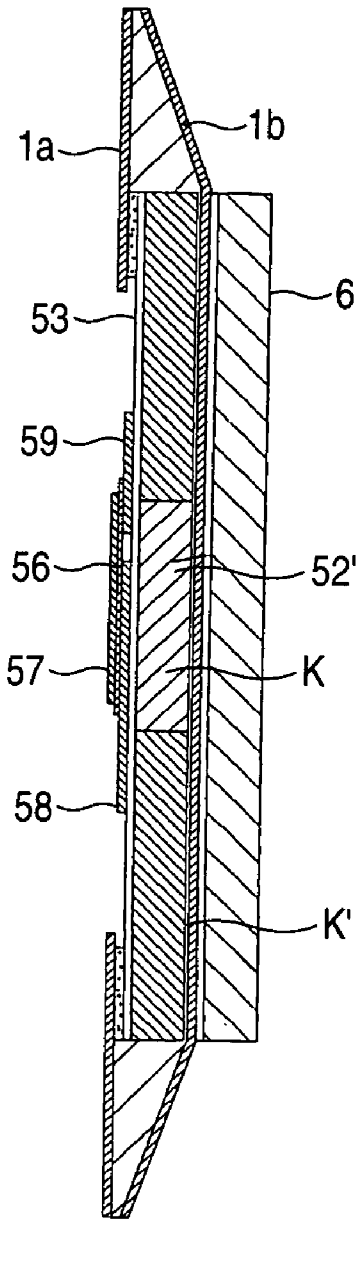

When the ink consumption progresses and an amount of remaining ink is reduced to such an ink amount level that the ink amount is extremely small, but allows the ink to be supplied to the recording head (viz., an ink end level), the ink container 1 is extremely thin as shown in FIG. 5B, and the recess 52' of the sensor module 5 is in contact with the second surface 1*b* supported by the rigid member 6. In this state, ink K and K' is present only in a region defined by the recess 52', viz., a region between the sensor module 5 and the rigid member 6.

When in this state, the piezoelectric vibrator 56 is activated as described above, the piezoelectric vibrator 56 generates a residual vibration after one forcible vibration as shown in FIG. 6B. The vibration occurs only at the region where the ink is present. Therefore, the vibration greatly attenuates, and in the residual vibration the vibrator vibrates about two to three times and settles down.

Figure 6D:
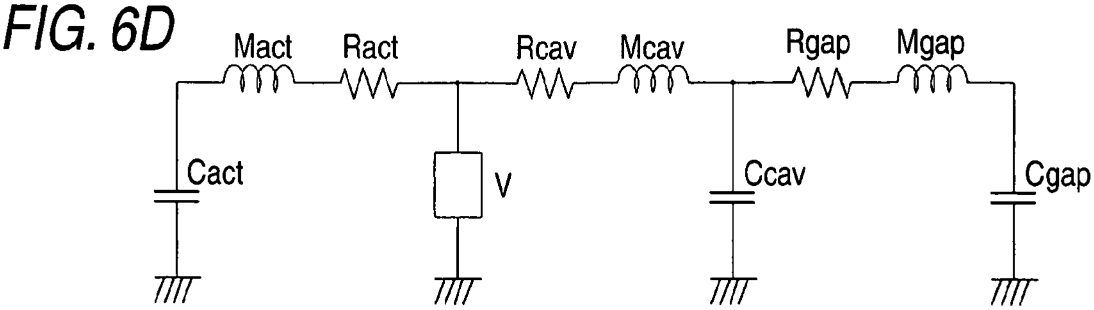

This state is expressed by an equivalent circuit shown in FIG. 6D. In the figure, Mgap, Cgap, and Rgap are respectively added inertance, compliance, flow resistance, and passage resistance of the region defined by the recess 52' of the sensor module 5.

In particular, as a ratio of the sum of acoustic resistance (Ract) of the piezoelectric vibrator, acoustic resistance (Rcav) of the cavity defined by the recess 52', and flow resistance (Rgap) to the sum of inertance (Mact) of the piezoelectric vibrator, added inertance (Mcav) of the ink in the cavity formed by the recess 52' and inertance (Mgap) of the region defined by the recess 52' and the rigid member 6 of the sensor module 5 is larger, an attenuation factor of the damped vibration of the piezoelectric vibrator 56 is larger.

The damped vibration is given by $$A+e^{(-(r/M))t} \quad \text{[Formula 1]}$$

where r=constant determined by resistance

M=inertance

A=constant t=time.

The expression shows that the attenuation factor depends greatly on the resistance component.

Thus, a continuation time of the residual vibration greatly varies depending on a position of the rigid member 6 to the recess 52' of the sensor module 5 as shown in FIGS. 6A and 68.

A continuation time of such a residual vibration may be detected by counting the number of waves of the residual vibration. The residual vibration is unstable immediately after the activation. Accordingly, it is desirable to count a third wave and the subsequent ones.

The continuation time of the residual vibration may also be detected by detecting an amplitude of the residual vibrations after a predetermined time elapses from the activation of the piezoelectric vibrator. A shape of the ink container 1 greatly changes depending on the amount of remaining ink. It is noted that the substrate 54 has such a rigidity as to keep its shape irrespective of the shape of the ink container 1. Therefore, the shape change per se of the ink container 1 little affects the residual vibration.

Figure 7A:
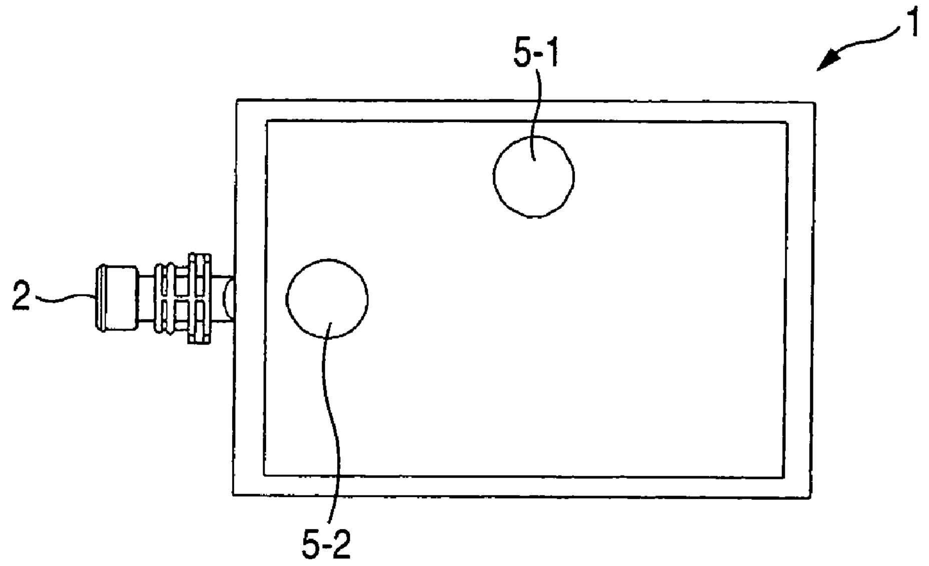
FIGS. 7A and 7B are plan views showing other ink containers each for use with an ink jet recording apparatus, which are other embodiments of the invention.

In the embodiment mentioned above, the sensor module 5 is provided at only one location of the ink container 1. In another embodiment of the invention shown in FIG. 7A, a plurality of sensor modules 5-1 and 5-2 are attached to the ink container 1, while being arranged in a vertical direction.

In the instant embodiment, the ink container 1 becomes flat from the top to the bottom as consumption of the ink contained therein progresses. Accordingly, the sensor module 5-1 first outputs a signal indicating that a predetermined amount of ink has been consumed.

A deformation form of the ink container 1 depends on an amount of ink left in the ink container. Accordingly, it is possible to reliably detect consumption of ink in a region between the sensor module 5-1 and the sensor module 5-2 by using amounts of remaining ink as are detected by the sensor modules 5-1 and 5-2. In the case of a recording apparatus which manages the amount of ink consumption based on the number of ink drops as jetted and the amount of ink absorption, an amount of remaining ink in a region which is located under the sensor module and include no sensor module attached thereto, and an ink end time can be exactly detected if related coefficients are appropriately corrected.

Figure 7B:
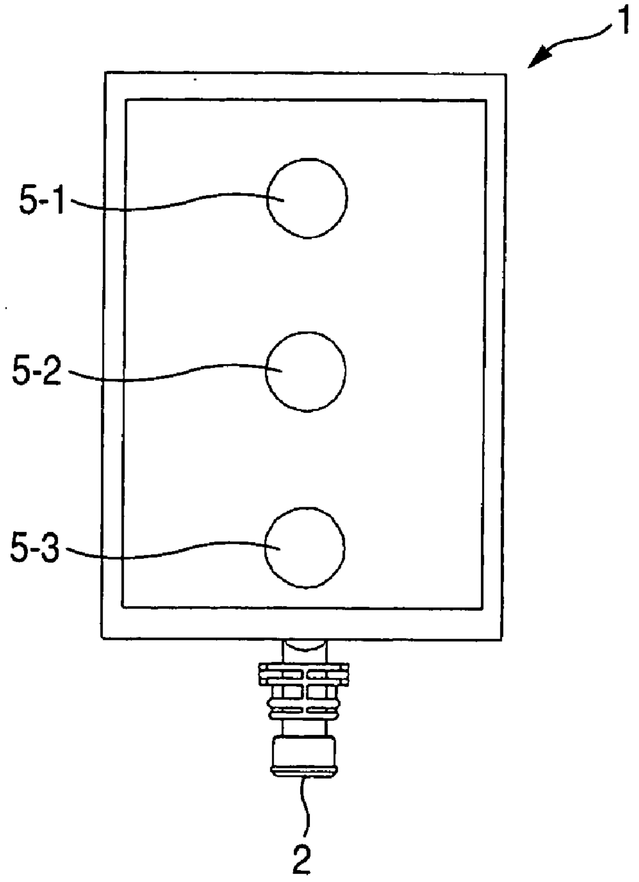

In the embodiments mentioned above, the ink supply port 2 is horizontally directed. For example, in a case where the ink container is mounted on a carriage, the ink supply port 2 is attached to the ink container 1 while being downwardly directed, as shown in FIG. 7B. And, three sensor modules 5-1 to 5-3 are provided while being vertically arranged.

Figure 8A:
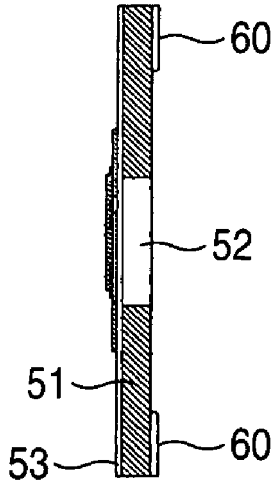
FIGS. 8A and 8B are cross sectional views showing the mounting of a sensor module and a rigid member, which are used in the ink container for an ink jet recording apparatus.

In the embodiments mentioned above, the sensor module (modules) 5 is firmly fixed to the inner surface of the ink bag forming the ink container. In a case where, as shown in FIG. 8A, a joining layer is formed on a back surface of the substrate 54, viz., an opposite surface of the surface thereof provided with the vibration plate 53, the sensor module 5 may be firmly fixed to the outer surface of the ink bag.

Figure 8B:
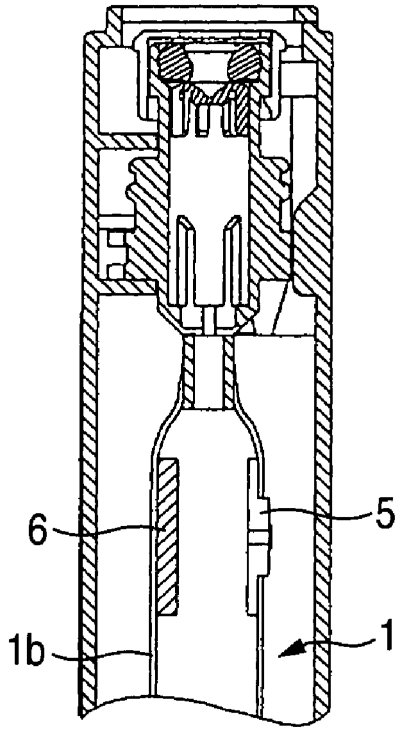

In each embodiment mentioned above, the rigid member 6 is attached to the outer side of the second surface 1*b* of the ink container I. If required, as shown in FIG. 8B, the rigid member 6 maybe attached to the inner side of the second surface 1*b* of the ink container 1, which is confronted with the sensor mobile 5.

Figure 9A:
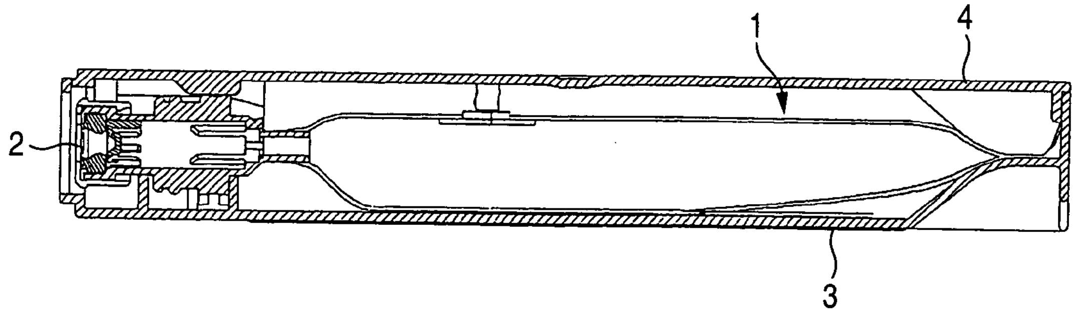
FIGS. 9A and 9B are a cross sectional view and a perspective view showing an ink container each for use with an ink jet recording apparatus, and a hard case, which are other embodiments of the invention.

In a case where the ink bag is used while being contained in a hard case, as shown in FIG. 9A, the second surface 1*b* of the ink container 1, which is confronted with the sensor module 5, is fastened to a hard case 3 with an adhesive layer being interposed therebetween, and a wall of the hard case 3 is used as the rigid member 6.

Figure 9B:
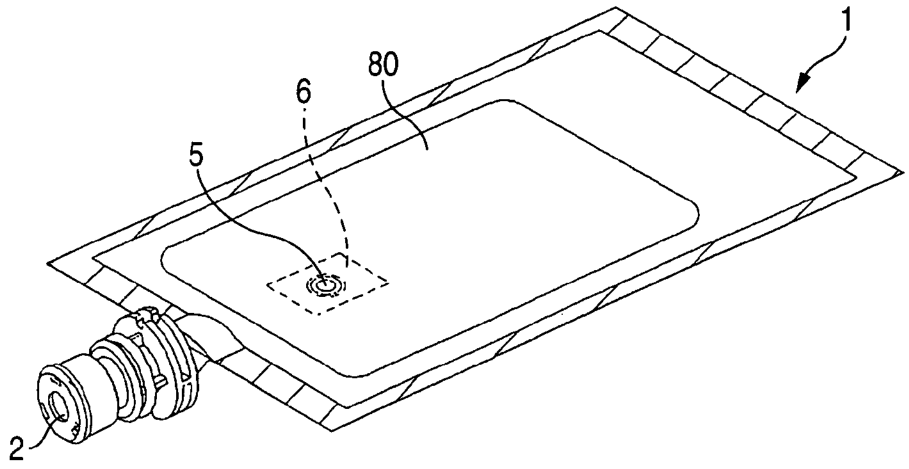

Further, to stably deform the ink container 1 with progress of ink consumption, viz., to stably shrink the ink container 1 in its thickness direction, it is effective to attach a thin plate 80 being appropriately flexible onto at least one of the surfaces 1*a* and 1*b* of the ink container 1, as shown in FIG. 9B.

Figure 10A:
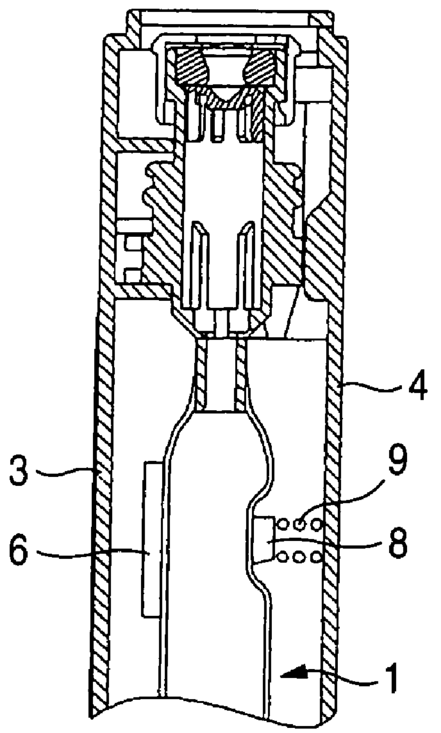
FIGS. 10A and 10B are a cross sectional view and a perspective view showing another form of the mounting of a sensor module on the ink container which is an additional embodiment of the invention.
Figure 10B:
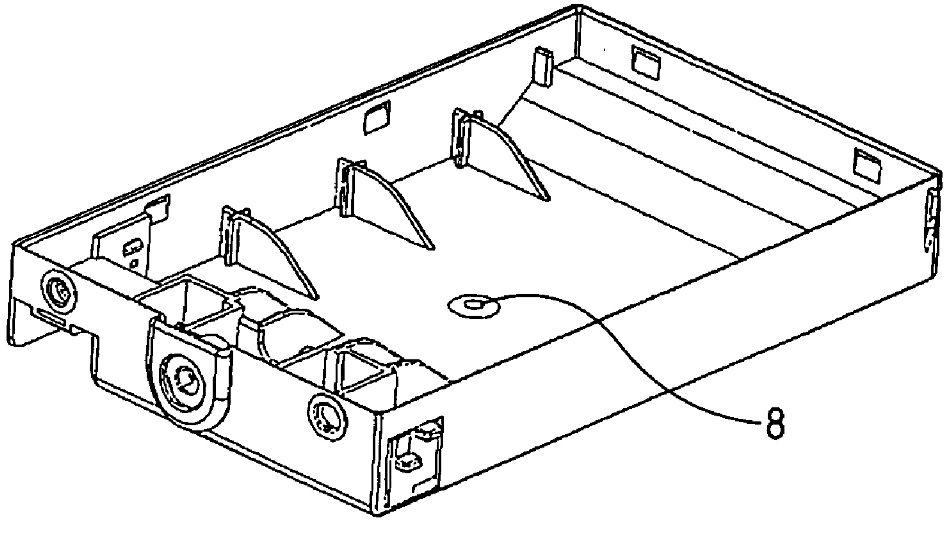

FIGS. 10A and 10B shows another embodiment of the invention. The embodiment is applicable to a case where the ink container 1 is contained in the hard case. In the embodiment, a vibration activating and detecting unit 8 of which the vibration energy is larger than that of the sensor module, such as a piezoelectric vibrator, is provided on the inner surface of a lid member 4 forming a hard case. The ink container 1 is urged by an urging unit 9, such as a spring, so as to receive a vibration from the vibration activating and detecting unit 8.

In a case where the ink container is used with its wide surfaces being horizontally disposed, only the vibration activating and detecting unit 8 as mentioned above may be provided on a bottom surface of the case body 3 forming the hard case. In this case, by the weight of the ink container 1, the vibration activating and detecting unit 8 is always in contact with the ink bag forming the ink container 1. Therefore, there is no need of using the urging unit 9 shown in FIG. 10A.

In the embodiment shown in FIGS. 10A and 10B, there is no need of applying any further working to the ink bag, and the amount of remaining ink is detected in a simple manner. In the specification describing the present invention, wording "to mount vibration activating and detecting unit on an ink container" involves every mounting form of the vibration activating and detecting unit on the ink container so as to allow a vibration to be emitted from the vibration activating and detecting unit to the ink container 1 and to enable the vibration activating and detecting unit to generate a vibration based on an amount of remaining ink" as in the embodiments.

Figure 11:
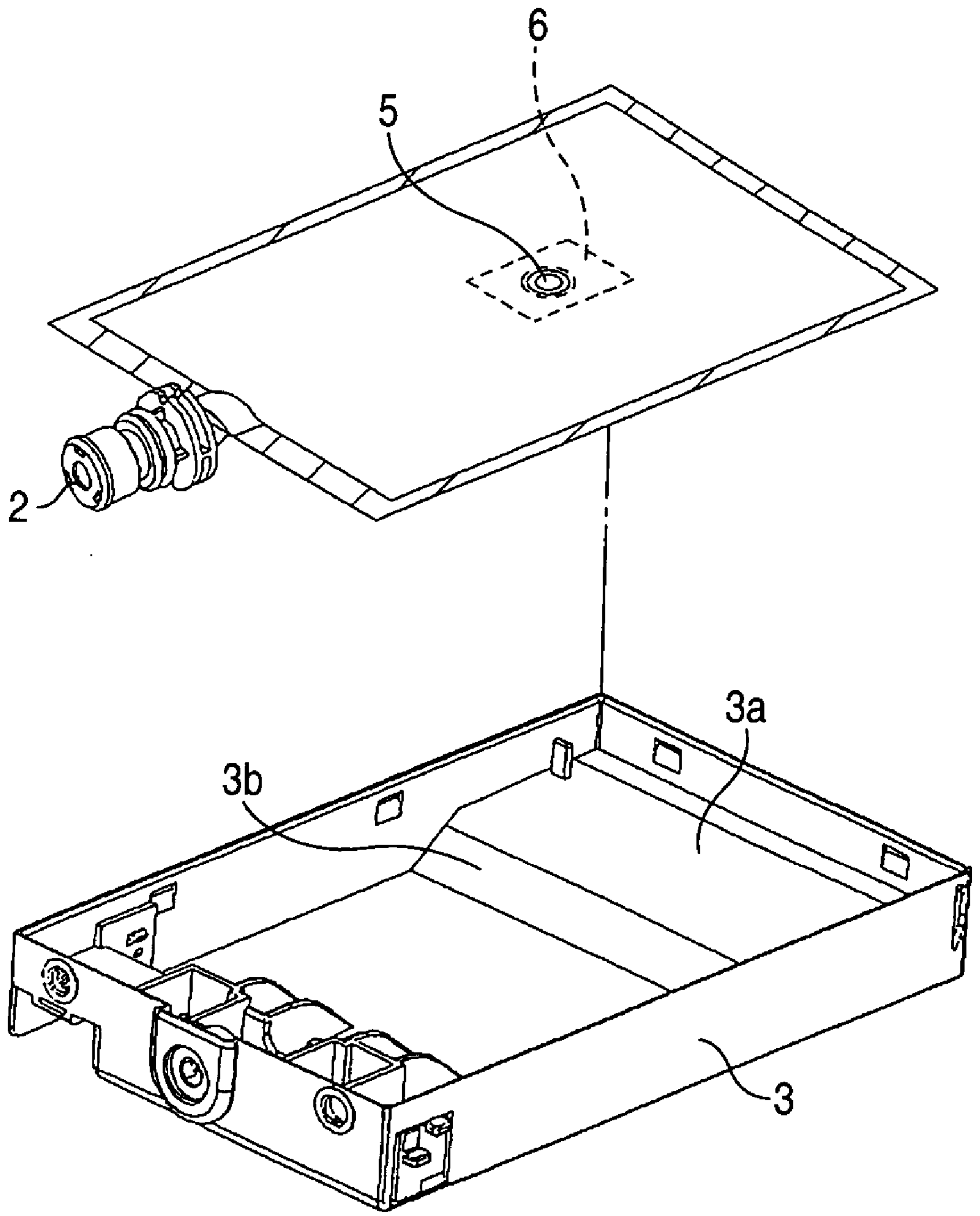
FIG. 11 is a perspective view showing an ink container for an ink jet recording apparatus, which is another embodiment of the invention.

FIG. 11 shows an embodiment of a hard case which is suitable for the case where the ink container is used with its wide surfaces being horizontally arranged. In the instant embodiment, a bottom surface 3*a* of the hard case is configured to have a stepped part 3*b* so that a portion of the bottom surface 3*a* ranging from the back end to a position located apart from the ink supply port. 2 (from the central part to the back end in the embodiment) is somewhat higher than another portion of the bottom surface 3*a* closer to the ink supply port 2. In the ink container 1, the sensor module 5 and the rigid member 6 are positioned at a location which is higher than the stepped part 3*b* of the hard case.

In the instant embodiment, when ink in the ink container 1 is consumed by a predetermined amount of ink to decrease its amount, a region of the ink container located at the raised portion of the ink container is forcibly flattened, whereby an amount of remaining ink is reliably detected. Similar advantages are secured even if the ink container is obliquely set to the recording apparatus such that the portion of the bottom surface closer to the ink supply port 2 is lowered in position by, for example, a distance substantially equal to a thickness of the ink container 1.

While in the embodiments mentioned above, the piezoelectric element is used for the vibration activating and detecting unit for constituting sensor module, it may be substituted by an electrostrictive element.

Figure 12:
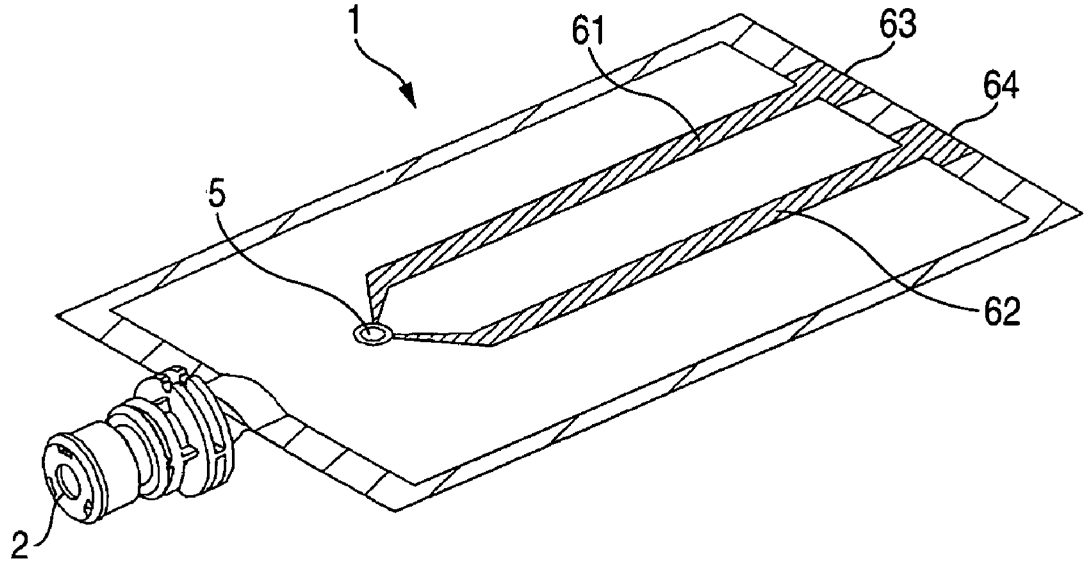
FIG. 12 is a perspective view showing an ink container for an ink jet recording apparatus, which is yet another embodiment of the invention.

The embodiments mentioned above each use the flexible cable 7 for transmitting drive signals and detecting signals to the sensor module 5. Instead of the flexible cable, conductive patterns 61 and 62, with edge portions 63 and 64, may be used. These conductive patterns are formed on the surface of the ink container as shown in FIG. 12. Use of the conductive patterns prevents adverse effects of external force caused by the rigidity of the flexible cable on the sensor module 5 as thoroughly as possible.

Figure 13:
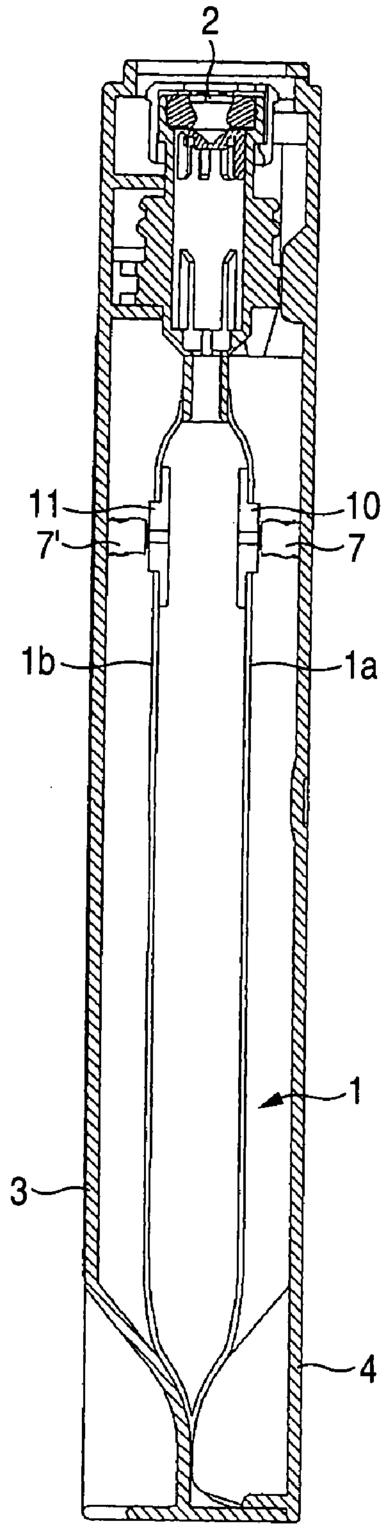
FIG. 13 is a sectional view showing an ink container for use with an ink jet recording apparatus, which is yet another embodiment of the invention.

FIG. 13 shows a further embodiment of the invention. In the instant embodiment, a sensor module 10 with the vibration activating and detecting unit is mounted on the first surface 1*a* of a region of the ink container, which is substantially opposed to a region thereof where is extremely thin when an ink level reaches a predetermined level of ink, viz., an amount of remaining ink is a predetermined value of ink amount. Another sensor module 11 with a vibration detecting unit is mounted on the second surface 1*b*. The supply of an activating signal and transmission of a detecting signal are performed through flexible cables 7 and 7'. When an amount of ink in the ink container is large, a distance between the surfaces 1*a* and 1*b* is long. Therefore, the vibration detecting unit cannot detect a vibration from the vibration activating and detecting unit. On the other hand, when an amount of ink in the ink container is small, a distance between the surfaces 1*a* and 1*b* is short. Therefore, the vibration detecting unit can detect a vibration from the vibration activating and detecting unit. Accordingly, the instant embodiment can detect an amount of ink or remaining ink based on a degree of flatness of the ink container as in the embodiments mentioned above.

In the instant embodiment, mere detection of presence or absence of the signal suffices when comparing with the case where the residual vibration immediately after the activation is detected in the embodiments mentioned above. Accordingly, the signal processing unit is simplified, and a thickness of the ink bag, which varies with ink consumption, may be detected in analog fashion, and hence, the amount of remaining ink can be continuously monitored.

Incidentally, the sensor module 5 may be directly used for the vibration activating and detecting unit and the vibration detecting unit, in addition to the normal piezoelectric or electrostrictive vibrator.

A storing unit may be attached to the ink container itself or the hard case containing the same in each of the embodiments. The storing unit stores an amount of ink contained in the ink container, manufacturing date of the container, a kind of ink, and rewritably stores an amount of ink consumed by the recording head. The storing unit is coupled to the recording apparatus in wire or wireless communication manner.

An amount of remaining ink detected by the sensor module 5 or the like or an ink amount, together with other data, is transmitted to the recording apparatus.

What is claimed is:

1. A liquid container for a liquid ejection device comprising:

a liquid supply port for supplying liquid to a liquid ejection head, a flexible member deformable in accordance with an amount of remaining liquid contained in the liquid container;

a vibration activating and detecting unit provided on a first surface of said liquid container, for emitting a vibration to said liquid; and a rigid member provided on a second surface of said liquid container so as to be opposed to said vibration activating and detecting unit;

wherein an amount of remaining liquid is detected based on a vibration characteristic of said vibration activating and detecting unit which depends on a distance between said vibration activating and detecting unit and said rigid member; and wherein the distance between said vibration activating and detecting unit and said rigid member is not predetermined prior to said detection.

2. A liquid container for a liquid ejection device according to claim 1, wherein said vibration activating and detecting unit includes a substrate capable of maintaining a constant shape irrespective of deformation of said liquid container.

3. A liquid container for a liquid ejection device according to claim 2, wherein an adhesive layer, with which said substrate is liquid-tightly fastened to said liquid container, is formed on a front or back surface of said substrate.

4. A liquid container for a liquid ejection device according to claim 1, wherein:

a through-hole is formed in said liquid container at a location corresponding to a vibration region of said vibration activating and detecting unit; and said vibration activating and detecting unit is provided on a substrate having a recess into which liquid of said liquid container flows, and a vibration is emitted from said vibration activating and detecting unit to said liquid via said recess.

5. A liquid container for a liquid ejection device according to claim 1, wherein said rigid member is stuck to an outer or inner surface of said liquid container.

6. A liquid container for a liquid ejection device according to claim 1, wherein a plurality of said vibration activating and detecting units, and a plurality of said rigid members, are arranged in a direction in which a liquid level of liquid in said liquid container changes.

7. A liquid container for a liquid ejection device according to claim 1, wherein said liquid container is housed in a hard case, and said rigid member is formed with said hard case.

8. A liquid container for use in a liquid ejection device according to claim 1, wherein said liquid container is housed in a hard case which has a raised portion in a predetermined region located apart from said liquid supply port in a region of said liquid container which serves as a bottom surface when said liquid container is set in the liquid ejection device.

9. A liquid container for use in a liquid ejection device according to claim 1, wherein conductive patterns are formed on a surface of said liquid container, and said conductive patterns are connected to said vibration activating and detecting unit.

10. A liquid container for use in a liquid ejection device according to claim 1, wherein at least one of the vibration activating and detecting unit and the rigid member are movable in relation to the other.

11. A liquid container for use in a liquid ejection device according to claim 1, wherein said liquid container is housed in a hard case, and the vibration activating and detecting unit is pressed on the first surface of the liquid container via an urging unit connected to the hard case.

12. A liquid container for use in a liquid ejection device according to claim 1, further comprising a thin plate arranged on at least one of the first and second surfaces of the liquid container to provide stability to the at least one of the first and second surfaces as the ink is drained from the ink container.

13. A liquid container for a liquid ejection device according to claim 1, wherein said liquid container is a flexible bag.

14. A liquid container for a liquid ejection device comprising:

a liquid supply port for supplying liquid to a liquid ejection head, a bag-like flexible member deformable in accordance with an amount of remaining liquid contained therein;

a vibration activating unit provided on a first surface of said liquid container, for emitting a vibration to said liquid; and a vibration detecting unit provided on a second surface of said liquid container, wherein the first and second surfaces are opposite to each other;

wherein an amount of remaining liquid is detected based on a vibration characteristic of said vibration detecting unit.

15. A liquid container for use in a liquid ejection device according to claim 14, wherein at least one of the vibration activating unit and the vibrating detecting unit are movable in relation to the other.

16. A liquid container for a liquid ejection device, comprising:

a liquid supply port for supplying liquid to a liquid ejection head, a flexible member deformable in accordance with an amount of remaining liquid contained in the liquid container;

a vibration activating and detecting unit, provided on a first surface of said flexible member, for emitting a vibration to said liquid; and a rigid member provided on a second surface of said flexible member, wherein the first and second surfaces are opposite to each other, wherein an amount of remaining liquid is detected based on a vibration characteristic of said vibration activating and detecting unit.

17. A liquid container for a liquid ejection device according to claim 16, wherein said vibration activating and detecting unit includes a substrate capable of maintaining a constant shape irrespective of deformation of said flexible member.

18. A liquid container for a liquid ejection device according to claim 17, wherein an adhesive layer, with which said substrate is liquid-tightly fastened to said flexible member, is formed on a front or back surface of said substrate.

19. A liquid container for a liquid ejection device according to claim 16, wherein:

a through-hole is formed in said flexible member at a location corresponding to a vibration region of said vibration activating and detecting unit; and said vibration activating and detecting unit is provided on a substrate having a recess into which liquid of said flexible member flows, and a vibration is emitted from said vibration activating and detecting unit to said liquid via said recess.

20. A liquid container for a liquid ejection device according to claim 16, wherein said rigid member is stuck to an outer or inner surface of said flexible member.

21. A liquid container for a liquid ejection device according to claim 17, wherein a plurality of said vibration activating and detecting units, and a plurality of said rigid members, are arranged in a direction in which a liquid level of liquid in said flexible member changes.

22. A liquid container for a liquid ejection device according to claim 16, wherein said flexible member is housed in a hard case, and said rigid member is formed with said hard case.

23. A liquid container for use in a liquid ejection device according to claim 16, wherein said flexible member is housed in a hard case which has a raised portion in a predetermined region located apart from said liquid supply port in a region of said flexible member which serves as a bottom surface when said flexible member is set in the liquid ejection device.

24. A liquid container for use in a liquid ejection device according to claim 16, wherein conductive patterns are formed on a surface of said flexible member, and said conductive patterns are connected to said vibration activating and detecting unit.

25. A liquid container for use in a liquid ejection device according to claim 16, wherein the vibration characteristic varies based on a distance between said vibration activating and detecting unit and said rigid member.

26. A liquid container for use in a liquid ejection device according to claim 16, wherein at least one of the vibration activating and detecting unit and the rigid member are movable in relation to the other.

27. A liquid container for use in a liquid ejection device according to claim 16, wherein said flexible member is housed in a hard case, and the vibration activating and detecting unit is pressed on the first surface of the flexible member via an urging unit connected to the hard case.

28. A liquid container for use in a liquid ejection device according to claim 16, further comprising a thin plate arranged on at least one of the first and second surfaces of the flexible member to provide stability to the at least one of the first and second surfaces as the ink is drained from the ink container.

29. A liquid container for a liquid ejection device, comprising:

a liquid supply port for supplying liquid to a liquid ejection head, a bag-like flexible member deformable in accordance with an amount of remaining liquid contained therein;

a vibration activating unit provided on a first surface of said flexible member, for emitting a vibration to said liquid; and a vibration detecting unit provided on a second surface of said flexible member, wherein the first and second surfaces are opposite to each other;

wherein an amount of remaining liquid is detected based on a vibration characteristic of said vibration detecting unit.

30. A liquid container for use in a liquid ejection device according to claim 29, wherein the vibration characteristic varies based on a distance between said vibration activating unit and said vibrating detecting unit.

31. A liquid container for use in a liquid ejection device according to claim 29, wherein at least one of the vibration activating unit and the vibrating detecting unit are movable in relation to the other.

32. A liquid container for a liquid ejection device, comprising:

a hard outer case and an ink bag contained within the hard outer case, the ink bag comprising:

a liquid supply port for supplying liquid to a liquid ejection head; and a flexible member deformable in accordance with an amount of remaining liquid contained in the liquid container;

a vibration activating and detecting unit, provided on a first surface of said flexible member, for emitting a vibration to said liquid; and a rigid member provided on a second surface of said flexible member, wherein the first and second surfaces are opposite to each other, wherein an amount of remaining liquid is detected based on a vibration characteristic of said vibration activating and detecting unit.

33. A liquid container for a liquid ejection device according to claim 32, wherein said vibration activating and detecting unit includes a substrate capable of maintaining a constant shape irrespective of deformation of said flexible member.

34. A liquid container for a liquid ejection device according to claim 33, wherein an adhesive layer, with which said substrate is liquid-tightly fastened to said flexible member, is formed on a front or back surface of said substrate.

35. A liquid container for a liquid ejection device according to claim 32, wherein:

a through-hole is formed in said flexible member at a location corresponding to a vibration region of said vibration activating and detecting unit; and said vibration activating and detecting unit is provided on a substrate having a recess into which liquid of said flexible member flows, and a vibration is emitted from said vibration activating and detecting unit to said liquid via said recess.

36. A liquid container for a liquid ejection device according to claim 32, wherein said rigid member is stuck to an outer or inner surface of said flexible member.

37. A liquid container for a liquid ejection device according to claim 32, wherein a plurality of said vibration activating and detecting units, and a plurality of said rigid members, are arranged in a direction in which a liquid level of liquid in said flexible member changes.

38. A liquid container for a liquid ejection device according to claim 32, wherein said rigid member is formed with said hard case.

39. A liquid container for use in a liquid ejection device according to claim 32, wherein said hard case has a raised portion in a predetermined region located apart from said liquid supply port in a region of said flexible member which serves as a bottom surface when said flexible member is set in the liquid ejection device.

40. A liquid container for use in a liquid ejection device according to claim 32, wherein conductive patterns are formed on a surface of said flexible member, and said conductive patterns are connected to said vibration activating and detecting unit.

41. A liquid container for use in a liquid ejection device according to claim 32, wherein the vibration characteristic varies based on a distance between said vibration activating and detecting unit and said rigid member.

42. A liquid container for use in a liquid ejection device according to claim 32, wherein at least one of the vibration activating and detecting unit and the rigid member are movable in relation to the other.

43. A liquid container for use in a liquid ejection device according to claim 32, wherein the vibration activating and detecting unit is pressed on the first surface of the flexible member via an urging unit connected to the hard case.

44. A liquid container for use in a liquid ejection device according to claim 32, further comprising a thin plate arranged on at least one of the first and second surfaces of the flexible member to provide stability to the at least one of the first and second surfaces as the ink is drained from the ink container.

45. A liquid container for a liquid ejection device, comprising:

a hard outer case and an ink bag contained within the hard outer case, the ink bag comprising:

a liquid supply port for supplying liquid to a liquid ejection head;

a flexible member deformable in accordance with an amount of remaining liquid contained therein;

a vibration activating unit provided on a first surface of said flexible member, for emitting a vibration to said liquid; and a vibration detecting unit provided on a second surface of said flexible member, wherein the first and second surfaces are opposite to each other, wherein an amount of remaining liquid is detected based on a vibration characteristic of said vibration detecting unit.

46. A liquid container for use in a liquid ejection device according to claim 45, wherein the vibration characteristic varies based on a distance between said vibration activating unit and said vibrating detecting unit.

47. A liquid container for use in a liquid ejection device according to claim 45, wherein at least one of the vibration activating unit and the vibrating detecting unit are movable in relation to the other.

* * * * *